Oct. 6, 1931.  T. E. HEPPENSTALL  1,826,247
PROCESS AND APPARATUS FOR DETERMINING THE
MOISTURE CONTENT OF SUBSTANCES
Filed Dec. 9, 1929   3 Sheets-Sheet 1

INVENTOR
Thomas E. Heppenstall
BY
ATTORNEY

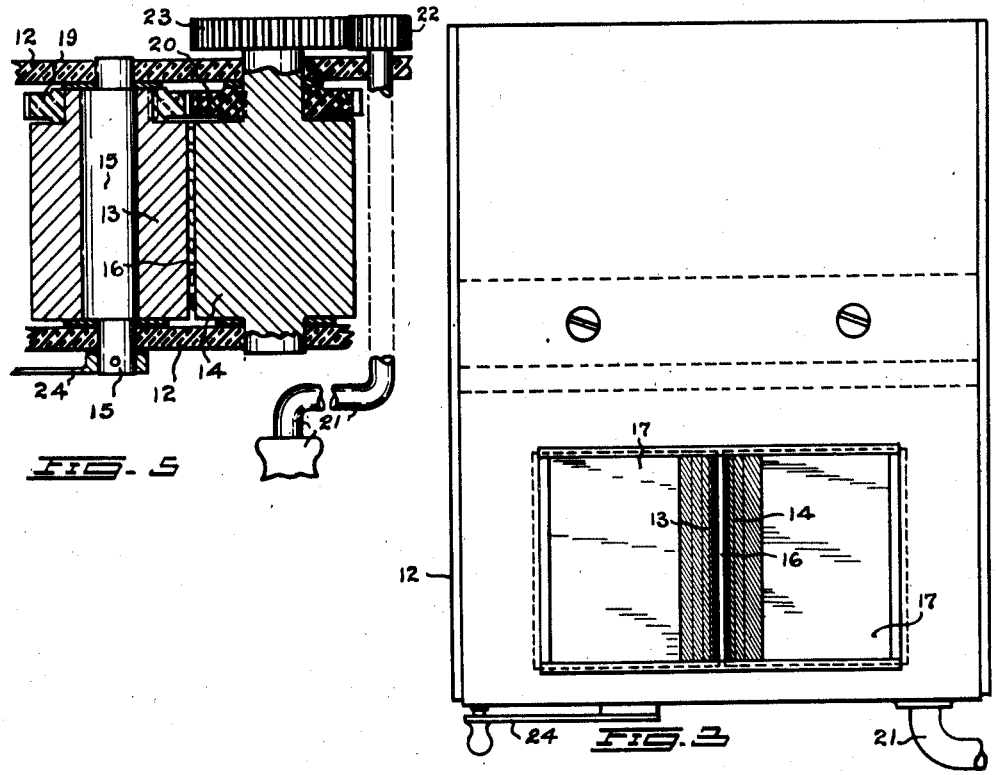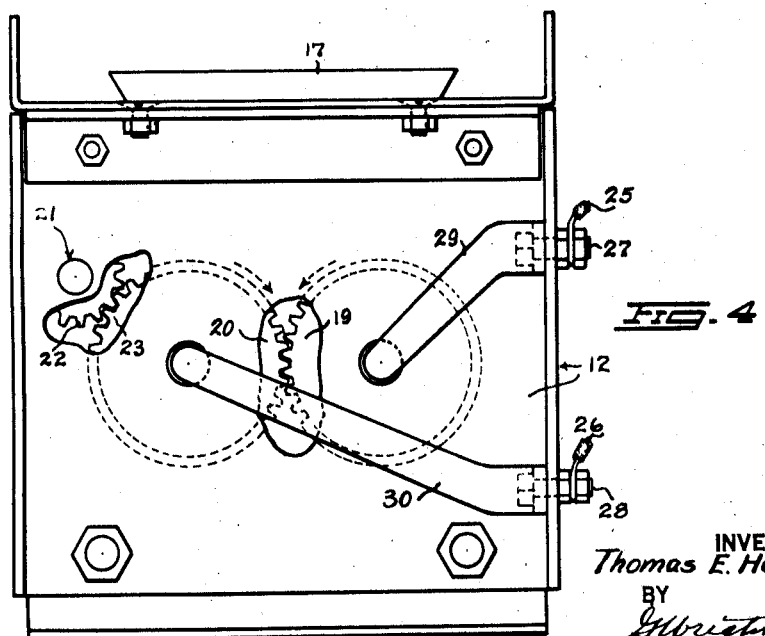

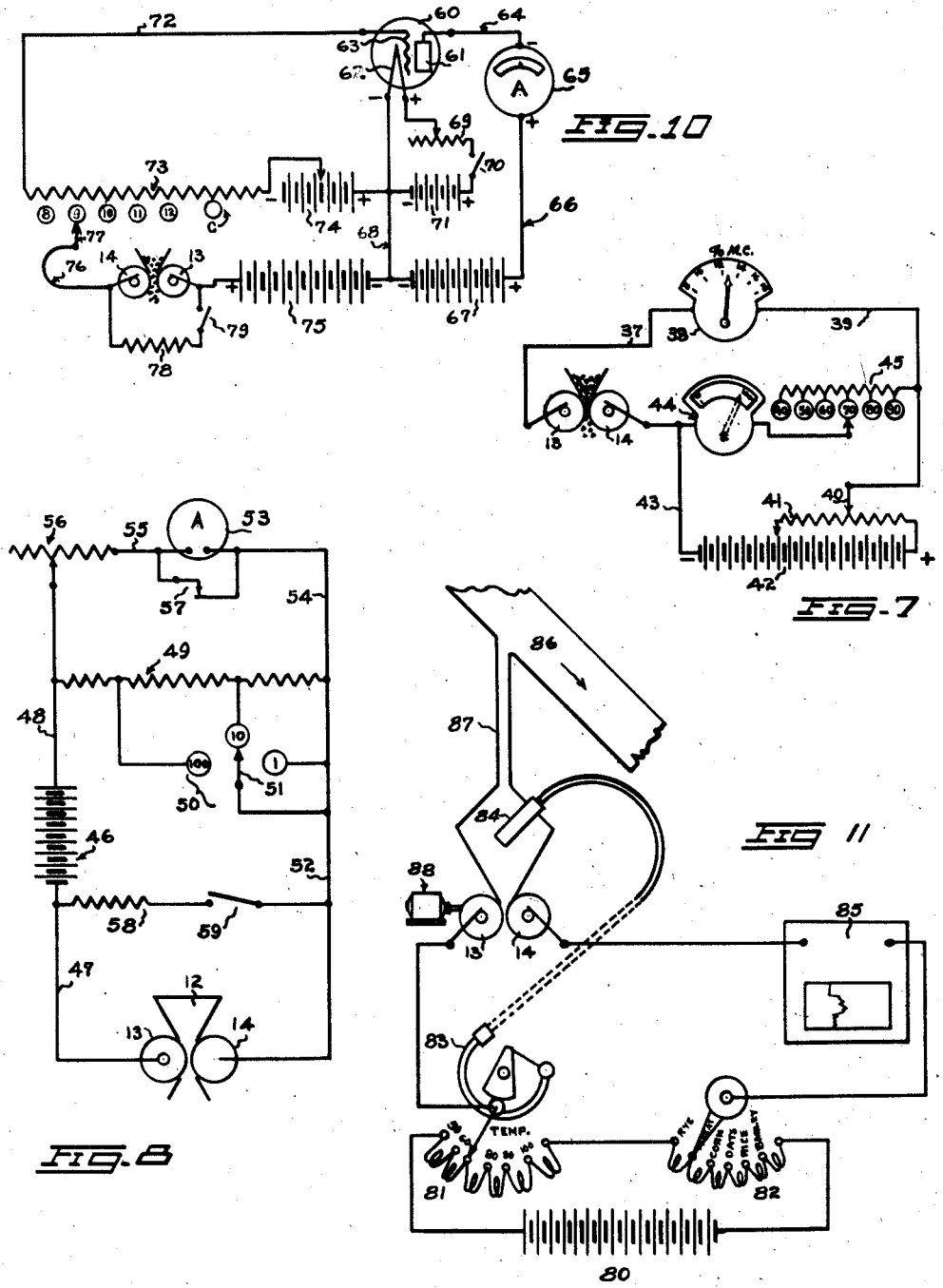

Patented Oct. 6, 1931

1,826,247

UNITED STATES PATENT OFFICE

THOMAS E. HEPPENSTALL, OF LONGVIEW, WASHINGTON

PROCESS AND APPARATUS FOR DETERMINING THE MOISTURE CONTENT OF SUBSTANCES

Application filed December 9, 1929. Serial No. 412,818.

My invention relates to a process for determining the moisture content of substances in the granular, pellet or small body form, and to the apparatus for carrying out the same.

For purposes of clearness and definiteness of illustration, I will set forth my invention as applied to the determining of moisture content in grain or cereals, but it will be understood that my invention is not to be limited to any such specific application but is to be deemed co-extensive to all applications where like conditions and problems obtain, as is exemplified and illustrated by grain flour and bran, cement and inorganic powders.

The determination of the moisture content of grain is important because grain valuation has long been based upon volume-weight, i. e., its volume determined by weighing. Moisture thus represents a valueless part of the grain. Further, the grain moisture determines the condition of its health, shipping and storage condition, that is, its qualities with direct technical reference to uses in agriculture, milling and baking. It is understood that in milling wheat flour it is the practice to have the moisture content not less than about twelve per cent (12%) to prevent cracking the shell coating so that it may be removed as a whole. When more than twelve per cent (12%) moisture content is present, there is danger of excess respiration, and souring of the grain is in proportion to the degree of respiration.

Water or moisture content is disposed in the substance physically and chemically and is held so tenaciously that it is exceedingly difficult if not impossible to remove the last traces of moisture by heating without material changes in the structure of the carrying substance and losses by distillation of the substance. Even though at first, a moisture determination is apparently easy to make, it is the experience of the cereal chemist, when due consideration is given to the hygroscopic properties of cereal grains, that a moisture determination is perhaps the most difficult problem with which he has to contend.

It is a primary object of my invention to provide a method of determining the water content without actual separation of the water, thereby avoiding any inaccuracy due to evaporation losses, also to provide a process which is reliable and is rapid, and which eliminates weighing and drying. I purpose providing a process characterized by being instantaneous and may be in continuous operation, while testing a large volume of a substance, as in the case of a cargo of grain while in the process of being loaded. Taking individual samples for tests as has been the common practice heretofore, confines the examination and determination to isolated and scattered parts of the cargo or shipment. As is commonly recognized, it is practically impossible to take a truly representative sample from the body of the grain in question. However, where individual samples are employed in connection with my device a much more accurate determination of the moisture content of the shipment is possible because the time period involved in making the test with my device is substantially instantaneous and therefore a far more extensive sampling is possible.

A further primary object of my invention is to provide an economically constructed device as well as one which involves an economical method of determining the moisture content, particularly economical in reducing the time period required to conduct the test and eliminating heating equipment, expensive fuel charges, technical expert and rental charges for extensive equipment.

By the aid of my device the grain farmer may himself readily determine whether or not, upon threshing, his grain has a moisture content that will permit his storing the same thereby enabling him to decide whether or not to sell at once or wait for better prices, and likewise, great losses to our food supply of grain may be avoided by the elevator operator in determining whether or not the condition of the grain is such that it may be safely stored.

Heretofore, the methods commonly practiced and in commercial use in determining the moisture content of grain, have been as follows:

*1. Oil method.*—This is the most common method and consists of boiling a known weight of wheat in oil, condensing the water driven off and determining the moisture content by measurement of this water. This involves heating to 180° C. and cooling to 160° C. Careful adjustment of the thermometer is necessary and is a very critical step. Such method is empirical, as any variation in the rate of heating, period of heating and maximum temperature and the position of the thermometer, etc., will lead to erroneous results. This method involves a time period of some forty minutes.

*2. The air oven and the vacuum oven.*—These ovens are ordinary heating ovens which can be kept at a uniform temperature for any length of time by thermostatic control. A weighed amount of wheat (say, 10 grams) is ground in a special mill and the ground grain placed in an oven at a definite temperature for a given time, usually at a temperature of 130° C. for one hour. The sample is weighed before and after heating and the difference in weight given as the water content.

This method gives results which are empirical in their nature and require the same nicety of adjustment of temperature, time of heating, position of sample in the oven, etc., as in the oil method.

A second method of manipulating the oven is to heat it to 100° C., or a few degrees above that, for a matter of some sixteen hours. It suffers the misfortune of requiring such a long period as almost to preclude its use, except for technical purposes.

*3. Inductance method.*—This method is based on the fact that test tubes of grain of different moisture content give variations in inductance when said test tubes are employed as the core of a solenoid, through which currents of radio frequency are induced. The accuracy of this device depends upon careful control of the frequencies of the current. The accuracy directly varies with the degree of compactness of the grain in the tube, which in turn is affected by the character of grain surface, size and shape or kernel, weed seeds, etc.

*4. Capacity method.*—This method employs radio frequency currents in which the grain is the dielectric and relies upon variation in condenser capacity instead of inductance as in the above method. All the objections to the inductance method apply substantially likewise to this method.

*5. Electric test cup method.*—This method employs a cup with insulated electrodes. The difficulties with this method involve polarization, since the current travels in the same path in this method. In contrast, in my method and device the current occupies a new path through the grain continuously, due to the revolving of the roller electrodes. Again, the method is too slow on account of necessity of filling and emptying the cup, and lack accuracy due to absence of uniformity in compactness.

Likewise, this method is objectionable owing to the fact that the irregular surface of the grain introduces variations in results and is periodic, that is, a single reading of a sample as a whole is involved while in my method a determination is made of each fractional quantity of a given sample so that a continuous determination is provided for each portion of the sample thus checking and re-checking the process. Obviously, a single reading of a sample does not provide an average valuation even for that sample, to accomplish which the method involves emptying the cup and after loosening the grain therein, to refill the cup and take several such readings of which the average is taken.

This cup method also involves passing the current through the grain by way of a comparatively long path, involving a plurality of kernels in series and thus makes an extremely delicate apparatus necessary for measurement of low moisture content. Such apparatus is influenced by leakages on the surface of the instrument itself. For this reason, as well as for said long path, the instrument is not adapted to measure to the same low per cent of moisture content as obtains in my device. With my device the path of the current is through a single kernel and many of these kernels are simultaneously tested so that the paths are parallel. That is, in my device, each kernel is caused to contact simultaneously both metallic electrodes.

Furthermore, by way of summary, it may be stated so far as known to me, none of the above described electrical methods for moisture determination are in practical use.

In general and briefly stated, I overcome the above objections, by my invention by providing a device which relies upon the electrical conductance of the materials being operated upon, as the same are drawn in, pressed, compressed or compacted by and between two electrodes which I provide in the special form of rollers which affect a predetermined short path for the current.

The above mentioned general objects of my invention, together with others inherent in the same, are attained by the device illustrated in the following drawings, the same being preferred exemplary forms of embodiment of my invention, throughout which drawings like reference numerals indicate like parts:

Fig. 3 is a plan view of the material testing part of the same;

Fig. 4 is a view of the rear side of the material testing part of the same, with parts broken away;

Fig. 5 is an enlarged view of the insulated roller electrodes showing eccentric shaft mounting for varying the space between the two rollers;

Fig. 6 is a modified form of mounting for the roller electrodes in which one of said rollers is resiliently mounted as respects the other;

Fig. 7 is a form of circuit illustrating a potential control which provides for taking into account the effect of temperature;

Fig. 10 is a diagrammatic view of the material testing device and an electrical circuit which employs a vacuum tube; and Fig. 11 is a modified form of circuit illustrating the invention connected to a grain chute for continuously testing the grain while passing through said chute.

Figure 8:
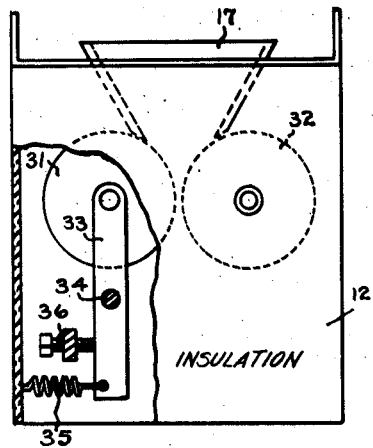
Fig. 8 is a diagrammatic sketch illustrating the preferred form of circuit operatively connected to a grain tester embodying my invention.
Figure 1:
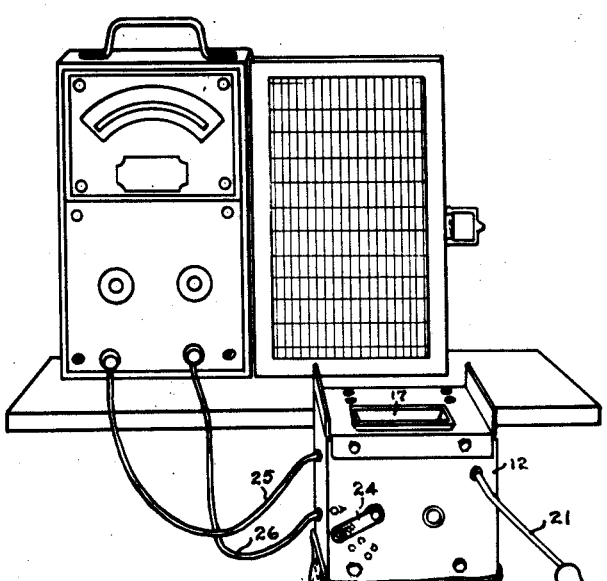
Figure 1 is a view in perspective of the material testing device embodying my invention.
Figure 2:
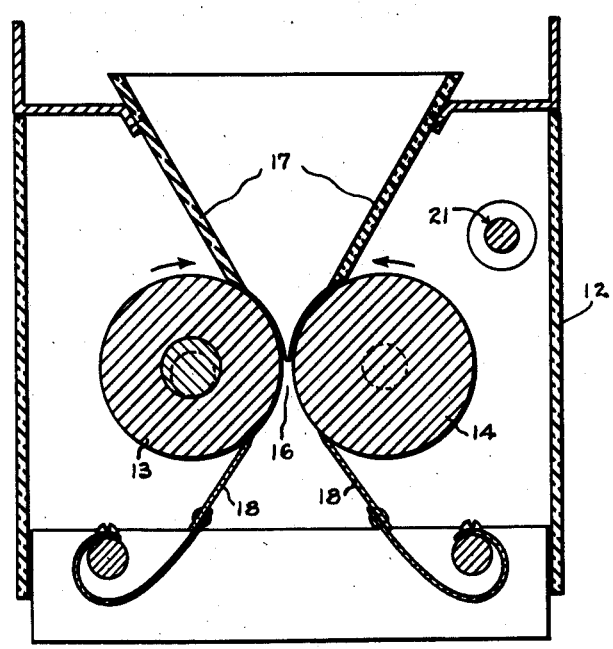
Fig. 2 is a view in cross section of the material testing part of the same.

In a suitable housing 12 of electrical non-conducting material, I provide two electrodes in the special form of rollers 13 and 14 which are mounted electrically insulated. These rollers may have a surface roughened which is preferably in the form of milling or knurling to grip the material being tested. Roller 13 is mounted in said housing 12 upon an eccentric shaft 15 whereby the space 16 between the rollers may be varied. A hopper is formed of plates 17. Spring mounted scrapers 18, of insulating material press upon the rollers 13 and 14 to remove any material being operated upon that may adhere thereto after passing between the electrode rollers revolving towards each other and downwardly. Internally of the housing 12, intermeshing gears 19 and 20, of electrical non-conducting material, are mounted upon rollers 13 and 14 respectively. A crank 21 is operatively connected to gear 22 which intermeshes with gear 23 to drive roller 14 on which is mounted gear 20 which in turn drives gear 19. A motor drive may be substituted as is hereinafter shown in Fig. 11.

The angular position of the eccentric shaft obviously determines the space between the rolls, and the shaft is locked at a predetermined angular position by means of the resilient arm 24 held in locking holes A, B, C, and D.

Electrical conductors 25 and 26, connect posts 27 and 28 mounted in housing 12 and these posts in turn are electrically connected to rollers 13 and 14 respectively by spring conductors 29 and 30 respectively, which press against the ends of the roller electrode shafts.

In the modified form of the mounting of the roller electrodes shown in Fig. 6, roller electrode 31 is resiliently mounted as respects roller electrode 32 on yoke 33 pivotally mounted at 34. A spring 35 operates to resiliently hold roller electrode 31 towards roller electrode 32. However, a minimum spacing between the rollers is provided by means of adjustable stop 36.

In the circuit shown in Fig. 7, conductor 37 connects one roller electrode to a micro-ammeter 38. Conductor 39 connects the micro-ammeter 38 to the slide 40 of potentiometer 41. Potentiometer 41 bridges a portion of the battery 42. The other end of battery 42 is connected by conductor 43 to the other roller electrode. The voltmeter 44 and rheostat 45 are connected in series between conductors 39 and 43, the said rheostat 45 being marked for temperatures 40, 50, 60, 70, 80 and 90.

This device is calibrated without regard to the temperature of the grain as follows: To provide a measuring device of conductivity, obviously, it is necessary to have a constant potential source of electricity. To do this, voltmeter 44 and rheostat 45 are bridged across conductors 39 and 43 with the slide arm of the rheostat about midway to measure the potential of the source. Such midway point is marked 70° (70° being about the temperature of the grain samples to be tested to calibrate the instrument). Then a point is placed on the voltmeter dial at 100 as the "calibration point" for all tests, i. e., as the point to which the potential of the circuit must be adjusted to have the readings correct or refer to a conductance standard. The needle of the voltmeter 44 is caused to register with 100 by means of adjusting the slide arm 40 of potentiometer 41. Having thus provided for a potential of known magnitude in the circuit, I next calibrate the micro-ammeter 38 by testing some grain of known moisture content at 70° F. i. e., running the same between the roller electrodes 13 and 14 and marking the deflection point of the needle of the micro-ammeter 38. This point is designated with the figures representing the value of the known moisture content of the grain. Similarly, other samples of different moisture content at 70° F. are tested and the deflections marked to provide a complete scale.

It will be understood that the electrical conductivity of moisture bearing materials increases with an increase in temperature of the materials, so that in general, corrections in the conductance must be made in order to determine the true moisture content. To provide a temperature scale on the rheostat, a grain of, say twelve per cent moitsure content at 50° F. is tested in the roller electrodes 13 and 14 and the rheostat 45 and potentiometer 41 simultaneously adjusted so as to make the needle of the micro-ammeter 38 coincide with the mark twelve per cent (determined as per above) and the needle of the voltmeter 44 coincide with the calibration point 100. Thereupon, the location of the arm of the rheostat 45 is marked 50° corresponding with the temperature of the grain sample. Similarly, other grain samples of different temperature and of the same moisture content, twelve per cent, are tested and their points marked on the rheostat, for example 40 to 90.

In the circuit shown in Fig. 8, a circuit is used which eliminates the use of a potentiometer across the battery and this circuit is described as follows:

Battery 46 is connected by conductor 47 to one roller electrode 13. The other terminal of the battery is connected by conductor 48 to one end of a universal shunt 49. This shunt is divided into three multiplying values connected to a dial switch 50 and these multiplying values are designated on the dial, for example, 1, 10, and 100. The dial switch arm 51 is connected to the other roller electrode 14 by a conductor 52. A micro-ammeter 53 is connected by conductor 54 to one end of the universal shunt 49 and conductor 55 connects the micro-ammeter 53 to a high resistance rheostat 56. The other terminal of the rheostat 56 is connected by conductor 48 to the other end of the universal shunt 49. Switch 57 is connected across the micro-ammeter terminals and is used to dampen the micro-ammeter when transporting.

A calibrating standard (i. e., known value) resistance 58, in this case 100,000 ohms and a switch 59 are connected in series between conductors 47 and 52.

The micro-ammeter scale 53 (Figs 8 and 9) is divided into any convenient units of conductivity extending from zero (0) to two hundred (200). The point one hundred (100) is marked on the dial of the meter, which point hereinafter will be referred to as the "calibration point".

To calibrate this device as a conductance measuring instrument, first turn universal shunt arm 51 to multiplier 10 of the dial 50, then the calibration resistance 58 is connected across the terminals of the electrodes by closing switch 59. Rheostat 56 is adjusted so that the needle of the micro-ammeter 53 coincides with the "calibration point". The meter is now calibrated for measurements of electrical conductance.

Samples of wheat grain of known moisture content are tested in the roller electrodes 13 and 14 and the corresponding conductance values of these are indicated on the micro-ammeter 53. These values are tabulated or charted and used for the determination of other samples of wheat grain in which the moisture contents is unknown. In this instance I am not marking the moisture content figures upon the dial but rather on a chart. Of course, said figures could be added to the dial as described for circuit shown in Fig. 7.

The following readings are from a complete chart of my determination. This chart as indicated is for wheat at 70° F. with a space adjustment 16 of the electrodes at .05 inches, and the spacing varies for different species of grain whose kernels are of different size such as wheat and corn.

*Conversion table for wheat at 70° F. with rollers spaced .05 inches apart*

| Conductivity reading | Moisture content in per cent |
|---|---|
| .105 | 7.3 |
| .115 | 7.4 |
| x | x x |
| x | x x |
| 13.4 | 12.1 |
| 14.7 | 12.2 |
| 16.4 | 12.3 |
| x | x x |
| x | x x |
| 6400. | 21.9 |
| 6700. | 22.0 |
| 6900. | 22.1 |

Applying the table: If the micro-ammeter 53 reads 14.7, this indicates that the grain has a moisture content of 12.2 per cent, this being the figure opposite the reading 14.7.

Figure 9:
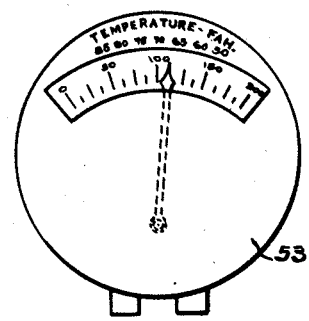
Fig. 9 is an enlarged view of the ammeter of Fig. 8 showing the dial with calibration points for temperature corrections.

Relative Fig. 9: Instead of using tables for each temperature of grain, I may have temperature calibration points on the dial as shown in Fig. 9. Accordingly, instead of having only one calibration point at 100 with its temperature mark 70° for grain at 70° F., I may provide other calibration points based on grain at temperatures 60°, 65°, 75° and 80°. Each of these points is determined as follows: Having calibrated the circuit as a conductance meter as described relative Fig. 8 with values from 0 to 200, the mark 70° is now placed arbitrarily above the calibration point, i. e. 100 as the center of a second scale located above the zero to 200 scale.

Thus referring to the tables prepared as explained for Fig. 8, I note the conductance reading on dial 53 as recorded for grain, say at 70° F. and 15 per cent moisture content and this is 168. Next, I obtain the conductance reading for 15 per cent moisture content grain at 85° F. and note its reading on the chart is about 336 or twice 168. Accordingly, on the new scale, over the conductance reading 50, which is half the conductance value at 70°, the temperature mark 85° F. is marked. Similarly, for each temperature mark desired, reference is made to the tables to determine the ratio of conductances at different temperatures (this varying for each temperature). For example, if this ratio from grain 80° is three to two, I place the mark 80 above conductance 66.6.

Relative Fig. 10: This circuit employs a vacuum tube 60, containing a plate 61, a filament 62 and a grid 63, and may be described as follows:

*The plate circuit.*—Plate 61 is connected by conductor 64 to the negative terminal of milliammeter 65. The positive terminal of the milliammeter 65 is connected by conductor 66 to the positive terminal of the plate battery 67. The negative terminal of the plate battery 67 is connected by conductor 68 to the negative terminal of the filament 62.

*Filament circuit.*—The positive terminal of the filament 62 is connected to the arm of rheostat 69 while the other terminal of the rheostat is connected to switch 70 which in turn is connected to the positive terminal of the filament battery 71. The negative terminal of this battery is connected by conductor 68 to the negative terminal of the filament 62.

*Grid circuit.*—Grid 63 is connected by conductor 72 to potentiometer 73. The other end of the potentiometer resistance is connected to a tapped bias battery 74. The positive terminal of this battery is connected by conductor 68 to the filament 62.

*Electrode circuit.*—A battery 75 is connected to the brush of roller electrode 13. The current goes through the material which is being tested to roll 14 and from its brush to conductor 76, thence to the sliding contact 77 of the potentiometer 73. The other terminal of the battery 75 is connected to the grid circuit by conductor 68. A high resistance 78 can be connected across the roller electrodes 13 and 14 by switch 79 for calibration purposes. The battery 75 can be connected with its negative terminal to the filament 62 as shown in Fig. 10 or, as will be readily understood, it may be connected with its positive terminal to the filament in which case it would be necessary to reverse the polarity of the bias battery so that its negative terminal would be connected to the filament. I prefer the connection shown in Fig. 10, however, as it makes it possible to eliminate the electrode battery 75 and use battery 67 for both plate and electrode battery by connecting electrode 13 to the positive terminal of the battery 67.

For clearness of description it will be assumed that a separate electrode battery 75 is used and connected with its negative terminal to the filament 62.

*Initial calibration.*—The next step is to calibrate the device as a whole. An arbitrary point at position twelve o'clock is marked on the dial of the milliammeter, hereinafter referred to as the "calibration point". The filament switch 70 is closed and the rheostat 69 and the negative potential of bias battery 74 are so manipulated that the maximum movement of the needle of the milliammeter is obtained above and below the "calibration point" when the path between roller electrodes 13 and 14 is alternately opened and closed with a piece of metal. The resistor 78 is then shunted across the test electrode path by closing switch 79 and the potentiometer sliding contact 77 moved along the potentiometer 73 to a position that causes the milliammeter needle to coincide with the "calibration point". This position of the sliding contact on the potentiometer is marked "C". The switch 79 is now opened and the needle of the milliammeter drops to a lower current value. This comparison with the standard resistor 78 is made previous to each time of use as a check and adjustment is made if necessary, of the rheostat. Bias battery 74 has to be adjusted at infrequent intervals depending upon the aging of the vacuum tube and the plate battery.

Grain of a known moisture content is now placed in the hopper over the roller electrodes 13 and 14 and the electrodes revolved. The slide arm 77 is moved along the potentiometer 73 to a position that causes the needle of the milliammeter 65 to coincide with the calibration point. This position of the slide arm 77 is then marked and labeled with the corresponding moisture content of the grain tested.

Grains of different moisture contents are similarly tested and finally the potentiometer 73 is calibrated into as many divisions as warranted by the accuracy of results expected. Intermediate values are readily noted by the position of milliammeter needle in respect to the "calibration point".

For testing of moisture content of grain of unknown moisture content: First, the switches 70 and 77 are closed and sliding contact 77 of the potentiometer 73 placed on point "C". The milliammeter needle is adjusted to coincide with the "calibration point" by the adjustment of the rheostat 69. The switch 79 is then opened and the needle of the milliammeter falls to a lower value. Grain is placed in the hopper of the testing electrodes and roller therethrough while the slide arm 77 is adjusted to cause the needle of the milliammeter to coincide with the "calibration point". The side arm 77 now indicates the moisture content.

Relative Fig. 11: A constant potential supply of current from a motor generator or battery 80 is required. Two potentiometers 81 and 82 are connected across this supply. Potentiometer 81 is calibrated into steps of resistance with a ratio equivalent to the ratio of change of conductance in grain at different temperatures, as above explained, for Figs. 7, 8 and 9. These steps are designated by their corresponding temperatures.

Potentiometer 82 may likewise be calibrated into steps for different species of grain such as corn, wheat, barley, rye and oats, these grains having slightly different values of conductance at the same moisture content. The temperature correcting potentiometer 81 is operated automatically by a Bourdon tube 83 whose bulb 84 is immersed in the grain sample in the hopper above the roller electrodes 13 and 14. Potentiometer 82 is manually set at the species to be tested.

The slide arm of the potentiometer 81 is connected to one roller electrode. Switch arm of potentiometer 82 may be connected to a recording or graphic meter 85. The other terminal of the graphic meter is connected to the other terminal of the roller electrode 14.

Chute 86 conveys the grain to cars, ships, storage or to grinders, etc. A pipe 87 draws off a small sample of this grain and conveys it to the roller electrode 13 and 14 which may be driven by motor 88. The roller electrodes 13 and 14 manifestly control the rate of testing of the grain and when the rollers cease to revolve at the conclusion of a test, manifestly they operate as a valve to prevent the further flow of the material being tested.

The mode of operation of the device embodying my invention in addition to the mode of operation of the circuits as above set forth, is as follows: Material to be treated such as grain, as for example, wheat, may be supplied to the hopper and the roller electrodes 13 and 14 revolved upon their axes. The space 16 is adjusted to be of a slightly less width than the diameter of a kernel of wheat so that a compressing or crushing of the grain ensues, thereby insuring positively a reliable uniformity of compactness of material, and during the instant of passing between the rollers the reading is recorded, while each kernel is contacting both rollers simultaneously and indicating the magnitude of conductivity of the kernels being treated. It will be understood that the electrical conductance increases rapidly as the moisture content of the grain increases. The electrical conductance of wheat containing fifteen per cent (15%) moisture is about two and one-half times that of wheat containing fourteen per cent (14%) moisture and five times that containing thirteen per cent (13%) moisture. This electrical conductance method therefore, gives a very open scale and a considerable variation in conductance can take place without seriously affecting the accuracy of the moisture determinations.

It will be understood that there will be a number of kernels of grain, some ten or some, depending upon the length of the electrode rollers, exposed in the hopper 19, passing simultaneously downwardly between the rollers, so that an average of the group is automatically obtained, the current passing through them in the shortest path and in parallel, each kernel contacting both electrodes simultaneously.

My device is designed to test the grain, kernel by kernel, vertically considered. Hence it is only the conductivity of a single kernel vertically considered, that is involved. In other words, the path of the current is reduced in length to less than the diameter of the kernel, said kernel being compressed or crushed. Thus much lower moisture content values may be determined by the device embodying my invention. Also, it is to be noted that polarization is avoided because in successive moments of time entirely different kernels or different portions of kernels of grain are being operated upon.

It is obvious, that by providing the roller form of electrodes, I not only provide for uniformity of compactness of the material, but I also avoid all difficulties of polarization of the grain and such rollers also eliminate all variations incident to variations in the degree of smoothness of the kernel. Preferably, both roller electrodes are driven to cause the grain to readily pass therebetween and not become heated through friction while passing between the rollers.

Relative compactness: As a result of extended experimentation, I have discovered that the conductivity of grain is directly proportional to pressure up to a certain point, that is, the lack of a certain degree of compactness means poor conductivity and the curve rises sharply until the degree of compactness is reached, represented by 50 pounds of pressure upon a kernel of wheat. From that point on, increasing the compactness by increased pressure has little effect. In other words, the graph or curve flattens out almost straight after reaching 50 pounds pressure per kernel. I therefore provide in my invention, the roller type of electrodes which can be adjusted as to their spacing so as to subject each kernel of grain as it passes through, to the degree of pressure represented by pressures above 50 pounds per kernel where a relative constancy as to conductivity is provided so far as the compactness of the substance is concerned.

Another important factor to be considered in eliminating error in determining moisture content relates to the length of the path of the current. The conductance varies indirectly with the length of the path of the current. I provide a spacing for wheat between the roller electrodes, for example, .05 of an inch, and thereby establish a uniform length of path and at the same time provide for a compactness as provided in the next preceding paragraph. By providing the uniform length of path, inaccuracies are eliminated which are incident to a varying length of path.

It will be understood that to avoid accident or injury to the roller electrodes that one of these may be resiliently mounted as shown in the modified form in Fig. 6. The resiliency of the spring 35 is adjusted to hold the roller in a predetermined spaced relation for all normal operation and at the same time to provide for a spreading of the rollers in case some material foreign to that being treated enters the rolls.

From the description herein, it is manifest that my invention is characterized by providing an exceedingly high degree of speed in determining the moisture content of a substance like grain. To determine the degree of accuracy as well as speed, I conducted extended tests on 110 samples of grain supplied and tested by the United States Department of Agriculture according to the methods heretofore obtaining. The three methods employed so far as these samples are concerned, were, the low temperature air oven drying, involving a 96 hour period, the 130° C. air oven method and the oil method. Using the low temperature air oven method as the base, I obtained results as follows:

| Error in per cent of moisture considering low temperature oven method accurate | Percentage of total number of samples having errors less than that shown in left column. | | |
|---|---|---|---|
| | Oil method | 130° C. air method | Electrical conductance method |
| 0.2 | 34.5 | 10.2 | 39. |
| 0.4 | 61.5 | 27. | 62. |
| 0.6 | 85. | 47. | 76. |
| 0.8 | 91. | 69.5 | 91. |
| 1.0 | 99. | 81.5 | 96. |

Thus, this table indicates that as high as 39 per cent of the samples, with my device, show less than 0.2 per cent of inaccuracy assuming the low temperature air oven method absolutely correct, while with the 130° C. air method it shows only 10.2 per cent of the samples to be within a degree of accuracy of 0.2 per cent, and the oil method had 34.5 per cent of samples showing less than 0.2 per cent error. Thus, it is manifest that my method, while instantaneous, so far as the period of time is involved in making the test, nevertheless is relatively as accurate as the oil method and shows throughout a constancy and exceedingly high degree of accuracy. Where a single sample is taken and ten readings are taken of the same sample by the oil method, and likewise ten readings are taken of the same sample by means of my device, a greater variation between the highest and lowest readings occurs in the case of the oil method, thereby establishing the degree of accuracy by means of my device to be greater, being less subject to errors due to manipulating technic.

The first three readings of the record of the test respecting the 110 samples, which are truly typical of the other samples are as follows:

| Sample number | Low temperature air oven | Oil | Electrical | 130° C. air oven |
|---|---|---|---|---|
| 1 | 17.98 | 18.0 | 18.3 | 19.48 |
| 2 | 19.8 | 19.4 | 19.4 | 20.76 |
| 3 | 13.44 | 13.3 | 12.4 | 14.52 |

These readings indicate that either the low temperate air oven is not extracting all the moisture or that there is something in the 130° C. air oven method that is bringing off fluid other than moisture. In other words, it is manifest that the low temperature air oven method and the 130° C. air oven method do not check each other nor does the oil method. It will be remembered that the calibration of the instrument embodying my invention is based upon samples having the moisture content determined according to the low temperature air oven method. The readings show clearly that the three evaporation methods do not harmonize.

Obviously, changes may be made in the forms, dimensions and arrangement of the parts of my invention, without departing from the principle thereof, the above setting forth only preferred forms of embodiment.

I claim:

1. In a device of the character described, the combination of two roller electrodes electrically insulated from each other and disposed positively in a predetermined minimum spaced relation as respects each other thereby providing for the passing of hydroscopic material in small body form therebetween while the moisture content of said material is being determined; means for actuating said rollers to draw in and compress the material to be tested; a hopper operatively disposed immediately above said roller electrodes; a conduit connecting said hopper to a material chute; and an electrical conductivity indicating device on which the conductivity values of the material being tested may be continuously indicated.

2. In a device of the character described, the combination of two roller electrodes electrically insulated from each other and disposed positively in a predetermined minimum spaced relation as respects each other thereby providing for the passing of hydroscopic material in small body form therebetween while the moisture content of said material is being determined; means for actuating said rollers to draw in and compress the material to be tested; a hopper operatively disposed immediately above said roller electrodes; a conduit connecting said hopper to a material chute; an electrical circuit connected to said roller electrodes; a conductance indicating device operatively connected in said circuit; and a thermostatic means for automatically varying the electrical potential of the circuit to correct for temperature.

3. A device of the character described embodying roller electrodes, said rollers being mounted in predetermined fixed minimum spaced relation thereby providing for the passing of hydroscopic material in small body form therebetween while the moisture content of said material is being determined; actuating means for said rollers whereby said material to be tested is drawn in and compressed; and an electrical conductivity measuring device connected electrically to said electrodes on which measuring device the conductivity values of said material being tested may be indicated.

4. In a device of the character described, two roller electrodes insulated from each other; and electrical conductor means connected to said electrodes to pass a current between them, said electrodes being disposed in a predetermined fixed spaced relation as respects each other, thereby providing for the passing of hydroscopic material in small body form therebetween while the moisture content of said material is being determined, and providing for the compression of said material to a predetermined minimum degree of compactness between the rollers which renders negligible irregularities in conductivity due to the degree of compactness of the material and which renders the length of the path of said electrical current uniform.

5. In a device of the character described, two roller electrodes insulated from each other between which hydroscopic material in small body form may be passed; and electrical conductor means connected to said electrodes to pass a current between them, said electrodes being separated by a space less than the shortest dimension of the individual bodies composing the material being tested, whereby each body is simultaneously contacted by both of said electrodes for its compression to a minimum degree of compactness and the paths of current passing through each body are in parallel.

6. A device of the character described embodying two roller electrodes insulated from each other between which hydroscopic material in small body form may be passed, said rollers being disposed in a predetermined fixed spaced relation as respects each other, thereby providing for the compression of said material to a predetermined degree of pressure which renders negligible irregularities in conductivity due to the degree of compactness of the material and which renders the length of the path of said electrical current uniform; electrical conductor means connected to said electrodes to pass a current between them; means for causing said hydroscopic material in small body form to be fed in a stream to said rollers and uniformly across the length of said rollers; actuating means whereby each of said rollers are positively driven at the same peripheral speed; and an electrical conductivity measuring device connected electrically to said electrodes on which measuring device the conductivity values of said material being tested may be indicated.

7. In a device of the character described, two scored roller electrodes insulated from each other between which grain may be passed, said scoring of the rollers providing for prompt passing of the grain thereby preventing heating of said grain; and electrical conductor means connected to said electrodes to pass a current between them, said electrodes being disposed in a predetermined fixed spaced relation as respects each other, thereby providing for the compression of said material to a predetermined minimum degree of compactness between the rollers which renders negligible irregularities in conductivity due to the degree of compactness of the material and which renders the length of the path of said electrical current uniform.

In witness whereof, I hereunto subscribe my name this 15th day of November, 1929.

THOMAS E. HEPPENSTALL.